(12) United States Patent
Kotsuji et al.

(10) Patent No.: US 11,577,514 B2
(45) Date of Patent: Feb. 14, 2023

(54) IMAGE FORMING APPARATUS AND FLUSHING CONTROL METHOD FOR ASSIGNING RESPECTIVE DOT PATTERNS FOR USE IN FLUSHING WITH INKS OF DIFFERENT COLORS ACCORDING TO NUMBER OF OVERLAPPING DOTS IN IMAGE

(71) Applicant: KYOCERA Document Solutions Inc., Osaka (JP)

(72) Inventors: Takuya Kotsuji, Osaka (JP); Hiroshi Yokota, Osaka (JP); Toshihiko Tanaka, Osaka (JP); Seiki Satomi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 68 days.

(21) Appl. No.: 17/321,294

(22) Filed: May 14, 2021

(65) Prior Publication Data

US 2021/0354470 A1    Nov. 18, 2021

(30) Foreign Application Priority Data

May 15, 2020    (JP) ............................. JP2020-085882

(51) Int. Cl.
| | | |
|---|---|---|
| *B41J 2/165* | (2006.01) |
| *H04N 1/50* | (2006.01) |
| *B41J 2/21* | (2006.01) |
| *H04N 1/60* | (2006.01) |

(52) U.S. Cl.
CPC ......... *B41J 2/16517* (2013.01); *B41J 2/2121* (2013.01); *H04N 1/502* (2013.01); *H04N 1/6008* (2013.01); *H04N 2201/0082* (2013.01)

(58) Field of Classification Search
None
See application file for complete search history.

(56) References Cited

U.S. PATENT DOCUMENTS

| | | |
|---|---|---|
| 6,357,846 B1 | 3/2002 | Kitahara |
| 2011/0050768 A1 | 3/2011 | Itogawa |
| 2012/0313991 A1 | 12/2012 | Itogawa |

FOREIGN PATENT DOCUMENTS

| | | |
|---|---|---|
| JP | 2000037867 A | 2/2000 |
| JP | 2011046068 A | 3/2011 |

*Primary Examiner* — Alejandro Valencia
(74) *Attorney, Agent, or Firm* — IP Business Solutions, LLC (57) ABSTRACT

An image forming apparatus includes a recording head that ejects inks of different colors on a recording medium to form an image based on image data, a storage device that stores a plurality of different dot patterns for flushing, and a control device that functions as: a controller that allows the recording head to make flushing; an image area detector that detects an image area in the image data; an overlapping dot counter that counts a number of overlapping dots for each of the plurality of dot patterns according to which flushing is to be made on the image area, the number of overlapping dots being a number of dots in the dot pattern of the ink ejected on the image area; and a dot pattern assignor that assigns, according to the number of overlapping dots, the respective dot patterns for use in flushing with the inks of different colors.

8 Claims, 8 Drawing Sheets

<NUMBER OF OVERLAPPING DOTS>
- TWO DOTS
- FOUR DOTS
- SIX DOTS
- ZERO

IMAGE FORMING APPARATUS AND FLUSHING CONTROL METHOD FOR ASSIGNING RESPECTIVE DOT PATTERNS FOR USE IN FLUSHING WITH INKS OF DIFFERENT COLORS ACCORDING TO NUMBER OF OVERLAPPING DOTS IN IMAGE

INCORPORATION BY REFERENCE

This application claims priority to Japanese Patent Application No. 2020-085882 filed on 15 May 2020, the entire contents of which are incorporated by reference herein.

BACKGROUND

The present disclosure relates to image forming apparatuses capable of printing on a sheet of paper by ejecting ink on the sheet and flushing control methods.

In an ink-jet image forming apparatus that makes prints by ejecting ink, if ink solidifies at an ejection hole of a nozzle due to drying or other reasons (clogging with ink), the ink cannot normally be ejected, so that an image may not properly be printed. To cope with this, there is generally used a method for preventing clogging with ink by, during printing, allowing a recording head to execute flushing that is forcible ink ejection unrelated to the image.

As a general technique for use in such an image forming apparatus, a first technique is known in which a meniscus as a liquid surface of the ink is microscopically oscillated according to the operating condition of the nozzle to prevent the increase in ink viscosity and thus stabilize the flight of ink droplets.

Furthermore, a second technique is known in which a treatment liquid capable of reducing bleed of ink landing later on a recording medium is applied to the recording medium to make dots formed thereon by flushing unnoticeable.

SUMMARY

A technique improved over the aforementioned techniques is proposed as one aspect of the present disclosure. An image forming apparatus according to an aspect of the present disclosure includes a recording head, a storage device, and a control device. The recording head ejects inks of a plurality of different colors on a recording medium to form an image based on image data on the recording medium. The storage device stores a plurality of different dot patterns for flushing. The control device includes a processor and functions, through the processor operating in accordance with a control program, as a controller, an image area detector, an overlapping dot counter, and a dot pattern assignor. The controller allows the recording head to execute flushing which is forcible ejection of the inks. The image area detector detects an image area in the image data. The overlapping dot counter counts a number of dots overlapping with the image area for each of the plurality of dot patterns according to which the inks are to be forcibly ejected on the image area under control of the controller, the number of overlapping dots being a number of dots in the dot pattern of the ink ejected on the image area. The dot pattern assignor assigns, according to the number of overlapping dots, the respective dot patterns for use in flushing with the inks of the plurality of different colors.

A flushing control method according to another aspect of the present disclosure is a flushing control method for an image forming apparatus including: a recording head that ejects inks of a plurality of different colors on a recording medium to print an image based on image data; a storage device that stores a plurality of different dot patterns for flushing; and a control device that includes a processor and, through the processor operating in accordance with a control program, allows the recording head to execute flushing which is forcible ejection of the inks. The flushing control method includes the steps of: detecting an image area in the image data; counting a number of dots overlapping with the image area for each of the plurality of dot patterns according to which the inks are to be forcibly ejected on the image area under control of the control device, the number of overlapping dots being a number of dots in the dot pattern of the ink ejected on the image area; and assigning, according to the number of overlapping dots, the respective dot patterns for use in flushing with the inks of the plurality of different colors.

DETAILED DESCRIPTION

Figure 1:
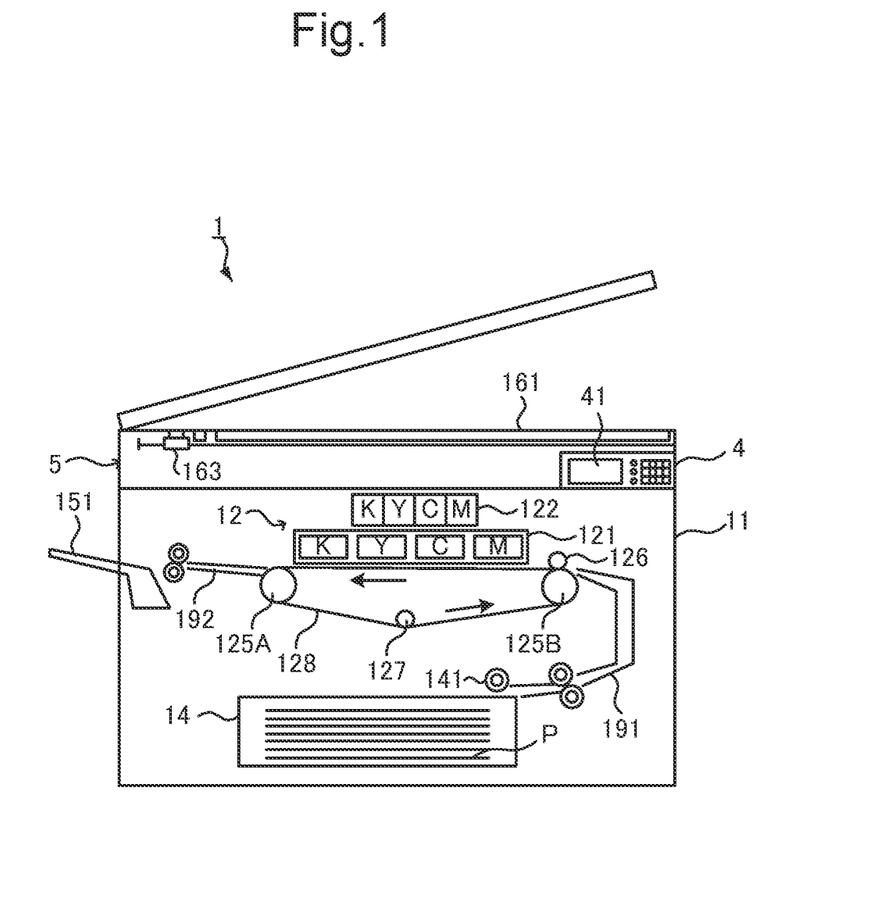
FIG. 1 is a frontal cross-sectional view showing an image forming apparatus.

Hereinafter, a description will be given of an image forming apparatus and a flushing control method according to an embodiment of the present disclosure with reference to the drawings. FIG. 1 is a frontal cross-sectional view showing an image forming apparatus according to an embodiment of the present disclosure. The image forming apparatus 1 is an image forming apparatus having a single function, such as a copier, a printer or a facsimile machine, or a multifunction peripheral having multiple functions, including a copy function, a print function, a scan function, and a facsimile function.

In the image forming apparatus 1, an apparatus body 11 includes an operation device 4, an image reading device 5, an image forming device 12, a sheet feed tray 14, and so on. The operation device 4 includes, for example, a menu key for calling up a menu, a determination key for making determinations of various operations or various settings, and a Start key. The operation device 4 includes a display device 41. The display device 41 is a liquid crystal display (LCD), an organic EL (organic light-emitting diode (OLED)) display or the like. The display device 41 displays, for a user, a message, an operation screen and so on.

In a document reading operation of the image forming apparatus 1, the image reading device 5 reads an image of an original document placed on a platen glass 161, for example, in an optical manner, and generates image data from the read image. The image reading device 5 includes a reader 163 including a lighting part, a CCD (charge coupled device) sensor, and so on.

In a printing operation of the image forming apparatus 1, based on image data generated by the image reading device 5, image data sent from an external device or other image data, the image forming device 12 ejects ink on a sheet of paper P fed from the sheet feed tray 14 to print on the sheet of paper P. A sheet feed roller 141 is provided above the sheet feed tray 14. The sheet feed roller 141 conveys sheets of paper P sheet by sheet toward a conveyance path 191.

The image forming device 12 prints an image or characters on a sheet of paper P. The image forming device 12 includes a drive roller 125A, a driven roller 125B, an adsorption roller 126, a tension roller 127, a conveying belt 128, a recording head 121, an ink tank 122, and so on.

The conveying belt 128 is an endless belt. The conveying belt 128 is mounted around the drive roller 125A, the driven roller 125B, and the tension roller 127. The drive roller 125A is a roller driven into counterclockwise rotation by a motor. When the drive roller 125A is driven into rotation, the conveying belt 128 travels counterclockwise (in the direction of the arrows in FIG. 1) and the driven roller 125B and the tension roller 127 rotate counterclockwise by following the travel of the conveying belt 128 engaged on them.

The tension roller 127 is a roller that keeps a tension state of the conveying belt 128. The adsorption roller 126 electrically charges the conveying belt 128 to electrostatically adsorb a sheet of paper P on the conveying belt 128.

The recording head 121 ejects four types of ink droplets of four different colors (black, cyan, magenta, and yellow) onto a sheet of paper P to form an image or characters on the sheet of paper P based on image data. The ink tank 122 is filled with the four types of inks of the four different colors. The printed sheet of paper P is conveyed along a discharge path 192 and then discharged to a sheet output tray 151.

Figure 2:
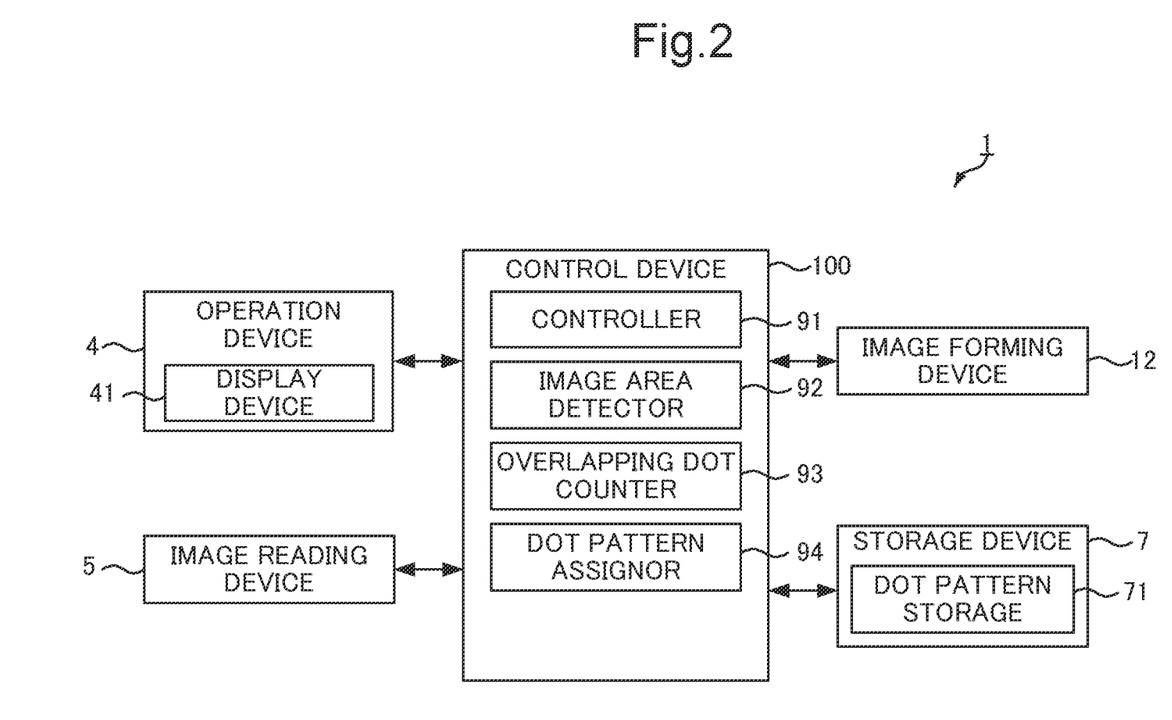
FIG. 2 is a functional block diagram showing an essential internal configuration of the image forming apparatus.

FIG. 2 is a functional block diagram showing an essential internal configuration of the image forming apparatus 1. As shown in FIG. 2, the image forming apparatus 1 includes a control device 100, the operation device 4, the image reading device 5, the image forming device 12, and a storage device 7.

The control device 100 is made up of a processor, a RAM (random access memory), a ROM (read only memory), and so on. The processor is a CPU (central processing unit), an MPU (micro processing unit), an ASIC (application specific integrated circuit) or the like. When the processor executes a control program stored in the ROM or the like, the control device 100 functions as a controller 91, an image area detector 92, an overlapping dot counter 93, and a dot pattern assignor 94. Each of the above components of the control device 100 may not be implemented by the operation of the control device 100 in accordance with the control program, but may be constituted by a hardware circuit.

The controller 91 governs the overall operation of the image forming apparatus 1 and controls flushing of the recording head 121. The image area detector 92 detects, in image data to be printed by the image forming device 12, an image area, such as a photograph, an illustration, a figure or the like.

The overlapping dot counter 93 counts the number of overlapping dots. Specifically, when each of a plurality of dot patterns for use in flushing with the inks is overlaid on an image area detected by the image area detector 92, some of the dots in each dot pattern overlap with the image area. The number of dots in the dot pattern overlapping with the image area is the above number of overlapping dots.

The dot pattern assignor 94 assigns, based on the respective numbers of overlapping dots in the dot patterns counted by the overlapping dot counter 93, the respective dot patterns for use in flushing with the inks of the different colors.

The storage device 7 stores data and programs necessary for the operations of the image forming apparatus 1. The storage device 7 includes a dot pattern storage 71.

Figure 3:
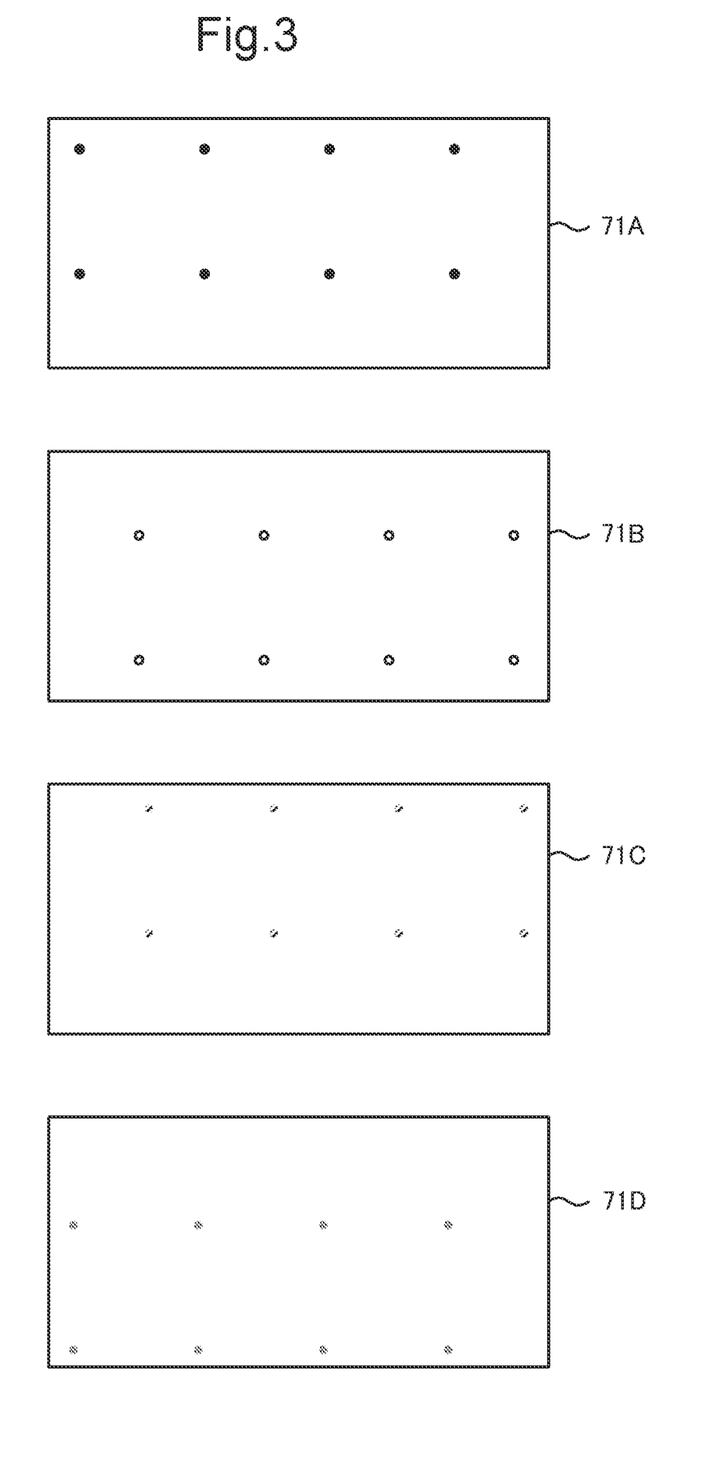
FIG. 3 is views showing examples of dot patterns stored in a dot pattern storage.

FIG. 3 is views showing examples of dot patterns stored in the dot pattern storage 71. In this embodiment, a description will be given under the assumption that the dot pattern storage 71 stores four different types of dot patterns 71A, 71B, 71C, and 71D.

Figure 4:
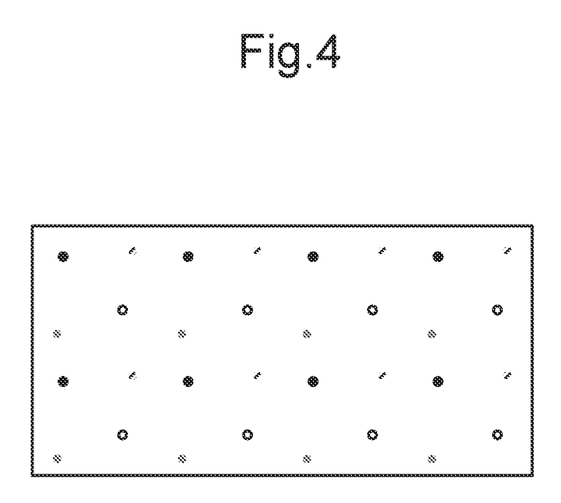
FIG. 4 is a view showing a state where all the dot patterns are overlaid.

In each of the dot patterns 71A, 71B, 71C, and 71D, dots are arranged evenly. The dots of each of the dot patterns 71A, 71B, 71C, and 71D do not overlap with the dots of the other dot patterns. FIG. 4 is a view showing a state where all the dot patterns 71A, 71B, 71C, and 71D are overlaid, that is, a view showing the locations of ink droplets that will be ejected when the image forming device 12 actually makes flushing.

Figure 5:
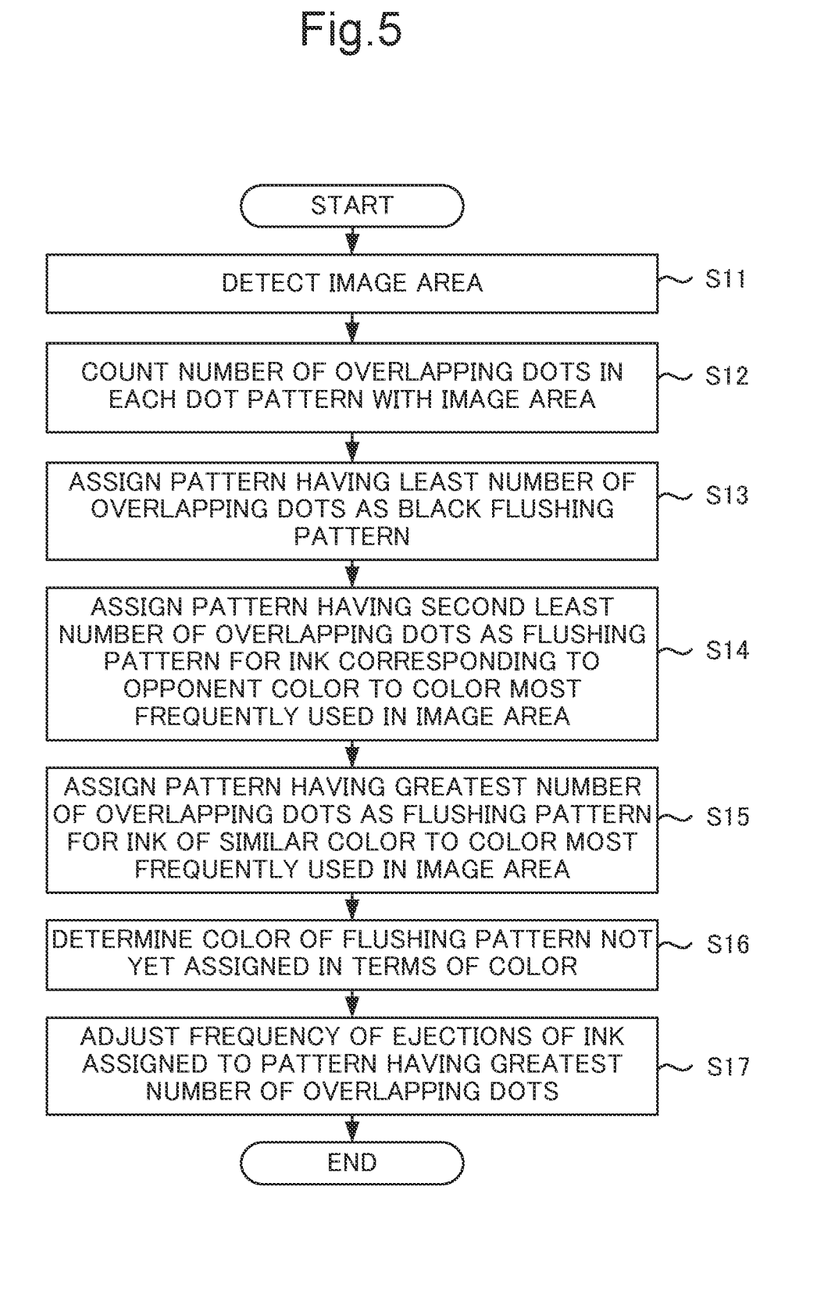
FIG. 5 is a flowchart showing the flow of dot pattern control processing.
Figure 6:
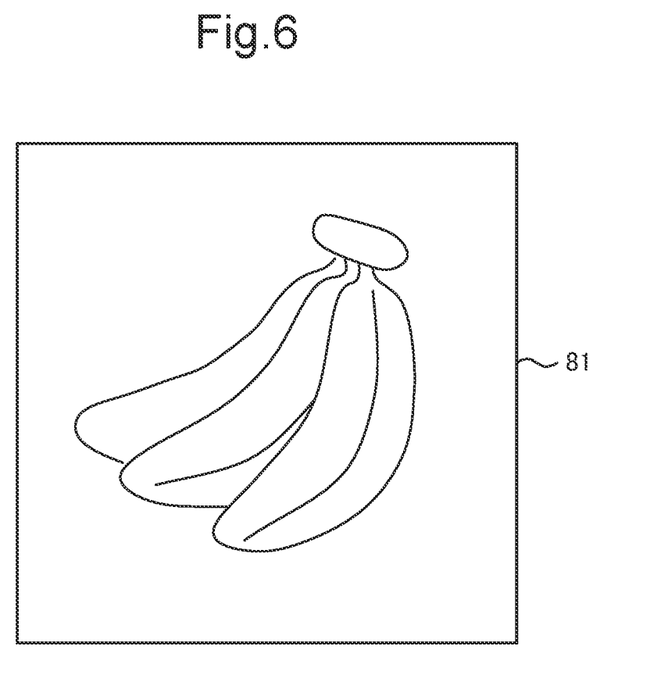
FIG. 6 is a view showing an example of an image.
Figure 7:
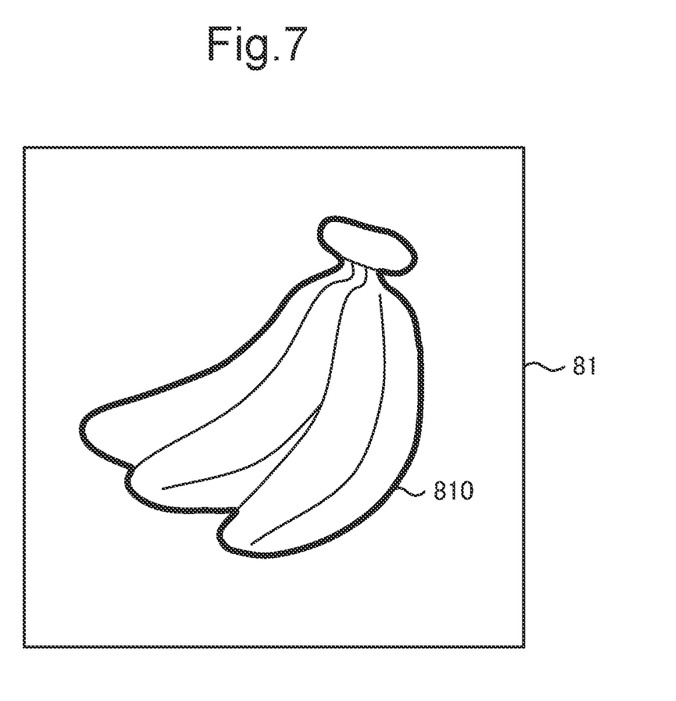
FIG. 7 is a view showing an image area.
Figure 8:
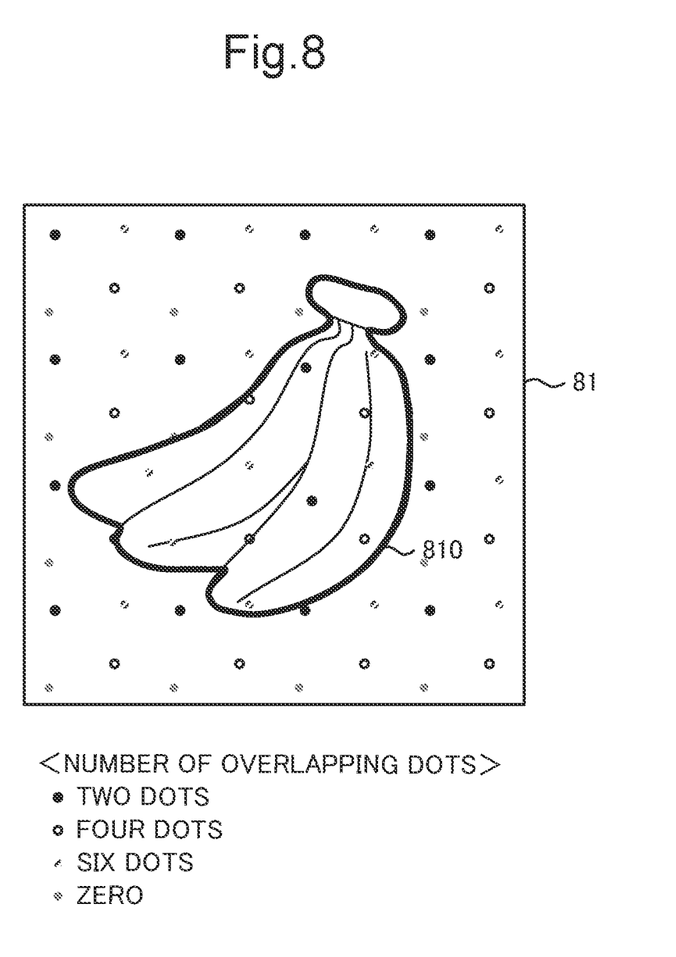
FIG. 8 is a view showing a state where all the dot patterns are overlaid on the image.

Next, a description will be given of the flow of dot pattern control processing. FIG. 5 is a flowchart showing the flow of dot pattern control processing. FIG. 6 is a view showing an example of an image. FIG. 7 is a view showing an image area extracted by the image area detector 92. FIG. 8 is a view showing a state where all the dot patterns 71A, 71B, 71C, and 71D are overlaid on an image 81.

First, the image area detector 92 detects an image area in image data to be printed by the image forming device 12 (step S11). For example, in the case of an image 81 shown in FIG. 6, the image area detector 92 extracts an image area of a banana and acquires the extracted image area (the coordinates or the like). The image area detector 92 extracts the image area 810 indicated by the bold line as shown in FIG. 7.

The overlapping dot counter 93 counts, for each of the dot patterns 71A, 71B, 71C, and 71D, the number of dots that will overlap (the number of overlapping dots) with the image area 810 if the dot patterns 71A, 71B, 71C, and 71D are overlaid on the image area 810 (step S12). As shown in FIG. 8, the overlapping dot counter 93 counts, for each dot pattern, the number of dots overlapping with the image area 810.

In the case shown in FIG. 8, the number of dots with the image area 810 is two in terms of the dot pattern 71A, four in terms of the dot pattern 71B, six in terms of the dot pattern 71C, and zero in terms of the dot pattern 71D.

The dot pattern assignor 94 assigns the pattern having the least number of overlapping dots as a flushing pattern for an ink of the lowest lightness color among the colors of the inks that the recording head 121 contains (step S13). Specifically, the dot pattern assignor 94 assigns the dot pattern 71D having the least number of overlapping dots as a flushing pattern for the black ink. Thus, the number of black flushing dots to be formed in the image area 810 can be reduced, so that the deterioration in image quality due to bleed or the like can be reduced.

The dot pattern assignor 94 selects, among three colors except for black assigned in step S13, a color corresponding to an opponent color to the color most frequently used in the image area 810 and assigns the dot pattern having the second least number of overlapping dots as a flushing pattern for the ink of the selected color (step S14).

Opponent colors are colors located opposite each other on the color wheel. In this embodiment, the opponent colors to yellow and magenta are assumed to be cyan and the opponent color to cyan is assumed to be magenta. In the case shown in FIG. 8, when the color most frequently used in the image area 810 is yellow, the formation of cyan flushing dots on a yellow image would make bleed or the like noticeable, leading to a deteriorated image quality.

Therefore, the dot pattern assignor 94 assigns the dot pattern 71A having the second least number of overlapping dots as a flushing pattern for cyan which is the opponent color to yellow.

Furthermore, the dot pattern assignor 94 selects, among two colors except for black and cyan assigned in steps S13 and S14, a similar color to the color most frequently used in the image area 810 and assigns the dot pattern having the greatest number of overlapping dots as a flushing pattern for the ink of the selected color (step S15).

Similar colors are colors located adjacent or close to each other on the color wheel. In the case shown in FIG. 8, since the color most frequently used in the image area 810 is yellow, the dot pattern assignor 94 assigns the dot pattern 71C as a flushing pattern for yellow which is a similar color.

Subsequently, the dot pattern assignor 94 assigns the dot pattern not yet assigned in terms of color as a flushing pattern for the ink of the remaining color (step S16). In this example, since the flushing pattern for black is the dot pattern 71D, the flushing pattern for cyan is the dot pattern 71A, and the flushing pattern for yellow is the dot pattern 71C, the dot pattern assignor 94 assigns the dot pattern 71B as a flushing pattern for magenta.

The controller 91 adjusts the frequency of ejections of the ink assigned to the dot pattern having the greatest number of overlapping dots (step S17). For example, in the above example, the ink assigned to the dot pattern 71C, which is the dot pattern having the greatest number of overlapping dots, is yellow. Since yellow is the color most frequently used in the image area 810, the frequency of ejections of the yellow ink during printing becomes high. Therefore, even if the frequency of forcible ejections of the ink by flushing is decreased, the possibility of occurrence of clogging with the ink at the ejection hole of the nozzle is low. In other words, since the yellow ink is forcibly ejected by flushing, even if the amount of yellow ink ejected for use in the image area 810 is reduced an amount of yellow ink for forcible ejection, this has less effect on an image to be formed.

For the above reason, the controller 91 allows the recording head 121 to flushing of the ink assigned to the dot pattern having the greatest number of overlapping dots by the dot pattern assignor 94, with a frequency of forcible ejections a predetermined number of times smaller than the initially set frequency of forcible ejections. Alternatively, as for the ink of the color most frequently used in the image area, the controller 91 decreases the frequency of ejections for image formation by the image forming device 12 to a value the number of overlapping dots smaller than the initially programmed frequency of ejections. Thus, the amount of ink consumed is reduced as much as possible.

For example, in step S17, the controller 91 makes (1) an adjustment of, instead of forcible ejection of the yellow ink within the image area 810, decreasing the frequency of forcible ejections of the yellow ink by the number of overlapping dots or (2) an adjustment of, instead of ejection of the yellow ink for the dots in the image area 810 overlapping with the dots of the yellow ink to be forcibly ejected, reducing the amount of ejection of the yellow ink in the image area 810 by the number of overlapping dots.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
   a recording head that ejects inks of a plurality of different colors on a recording medium to form an image based on image data;
   a storage device that stores a plurality of different dot patterns for flushing; and
   a control device that includes a processor and functions, through the processor operating in accordance with a control program, as:
   a controller that allows the recording head to execute flushing which is forcible ejection of the inks;
   an image area detector that detects an image area in the image data;
   an overlapping dot counter that counts a number of dots overlapping with the image area for each of the plurality of different dot patterns if an ink is to be forcibly ejected on the image area under control of the controller according to the each of the plurality of different dot patterns; and
   a dot pattern assignor that assigns, according to the number of overlapping dots, each of the plurality of different dot patterns for use in flushing with each of the inks of the plurality of different colors.

2. The image forming apparatus according to claim 1, wherein the dot pattern assignor assigns a dot pattern having a least number of overlapping dots as a dot pattern for use in flushing with an ink of a lowest lightness color among the plurality of different colors.

3. The image forming apparatus according to claim 2, wherein the dot pattern assignor assigns a dot pattern having a second least number of overlapping dots as a dot pattern for use in flushing with an ink of an opponent color to a color most frequently used in the image area.

4. The image forming apparatus according to claim 1, wherein the dot pattern assignor assigns a dot pattern having a greatest number of overlapping dots as a dot pattern for use in flushing with an ink of a similar color to a color most frequently used in the image area.

5. The image forming apparatus according to claim 4, wherein the controller allows the recording head to execute flushing of the ink assigned to the dot pattern having the greatest number of overlapping dots, with a frequency of forcible ejections decreased by a predetermined number of times.

6. The image forming apparatus according to claim 4, wherein the controller decreases, as for the ink of the color most frequently used in the image area, the frequency of ejections of the ink of the recording head by the number of overlapping dots.

7. The image forming apparatus according to claim 1, wherein the recording head ejects, as the inks of the plurality of different colors, black, cyan, magenta, and yellow inks.

8. A flushing control method for an image forming apparatus comprising: a recording head that ejects inks of a plurality of different colors on a recording medium to print an image based on image data; a storage device that stores a plurality of different dot patterns for flushing; and a control device that includes a processor and, through the processor operating in accordance with a control program, allows the recording head to execute flushing which is forcible ejection of the inks, the flushing control method comprising the steps of:
   detecting an image area in the image data;
   counting a number of dots overlapping with the image area for each of the plurality of different dot patterns if an ink is to be forcibly ejected on the image area under control of the control device according to the each of the plurality of different dot patterns; and assigning, according to the number of overlapping dots, each of the plurality of different dot patterns for use in flushing with each of the inks of the plurality of different colors.

\* \* \* \* \*